United States Patent [19]

House et al.

[11] Patent Number: 4,686,051

[45] Date of Patent: * Aug. 11, 1987

[54] METHOD OF INCREASING THE RATE OF HYDRATION OF ACTIVATED HYDROXYETHYL CELLULOSE COMPOSITIONS

[75] Inventors: Roy F. House, Houston; Lonnie D. Hoover, Chappell Hill, both of Tex.

[73] Assignee: NL Industries, Inc., New York, N.Y.

[*] Notice: The portion of the term of this patent subsequent to Dec. 13, 2000 has been disclaimed.

[21] Appl. No.: 637,971

[22] Filed: Aug. 6, 1984

Related U.S. Application Data

[62] Division of Ser. No. 262,026, May 8, 1981, Pat. No. 4,476,032.

[51] Int. Cl.[4] .......................... C09K 3/00; C09K 7/02
[52] U.S. Cl. .............................. 252/8.551; 252/8.553 252/8.513; 252/8.553
[58] Field of Search ............ 252/8.55 R, 8.5 A, 8.5 E, 252/8.551, 8.511, 8.513

[56] References Cited

U.S. PATENT DOCUMENTS

| | | | |
|---|---|---|---|
| 3,852,201 | 12/1974 | Jackson | 252/8.5 A |
| 4,046,197 | 9/1977 | Gruesbeck, Jr. et al. | 252/8.5 A X |
| 4,292,183 | 9/1981 | Sanders | 252/8.55 R |
| 4,304,677 | 12/1981 | Stauffer et al. | 252/8.55 R |
| 4,330,414 | 5/1982 | Hoover | 252/8.5 A |
| 4,350,601 | 9/1982 | Mosier et al. | 252/315.3 X |
| 4,420,406 | 12/1983 | House et al. | 252/363.5 X |
| 4,476,032 | 10/1984 | House et al. | 252/8.5 A X |

FOREIGN PATENT DOCUMENTS 2000799  1/1979  United Kingdom.

OTHER PUBLICATIONS

Place et al.: "High Density Fluids for Completions and Workovers", Presented at the European Offshore Petroleum Conference and Exhibition, Oct. 1980, pp. 497-499.

Primary Examiner—Richard D. Lovering
Attorney, Agent, or Firm—Browning, Bushman, Zamecki & Anderson

[57] ABSTRACT

A method of producing a well servicing fluid containing zinc bromide in which an activated hydroxyethyl cellulose is either admixed with a zinc bromide solution containing above about 30% by weight zinc bromide, or, in the alternative, is admixed with a non-zinc bromide containing solution to produce a viscosified solution which is then admixed with a zinc bromide containing solution.

6 Claims, 4 Drawing Figures

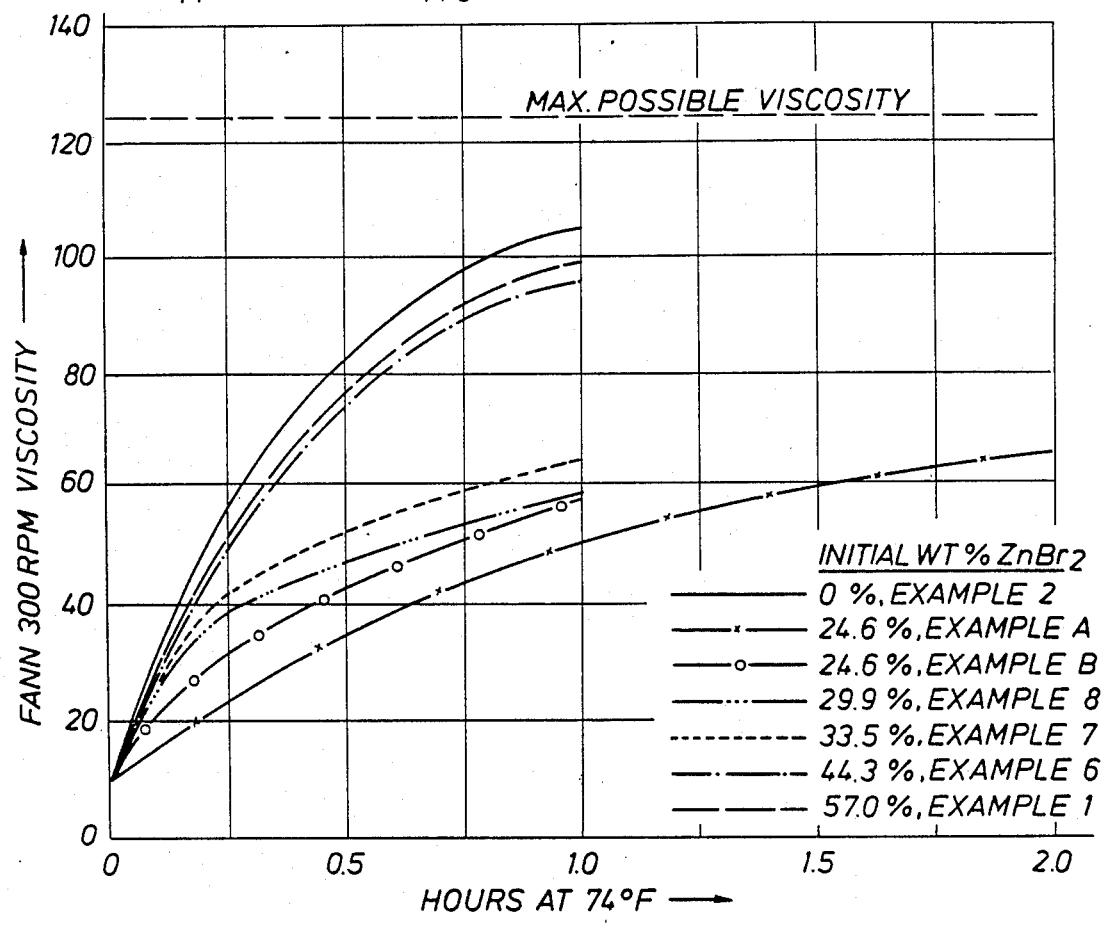
FIG.1 1.5 ppb. HEC IN A 16.0 ppg BRINE CONTAINING 24.6% ZnBr₂
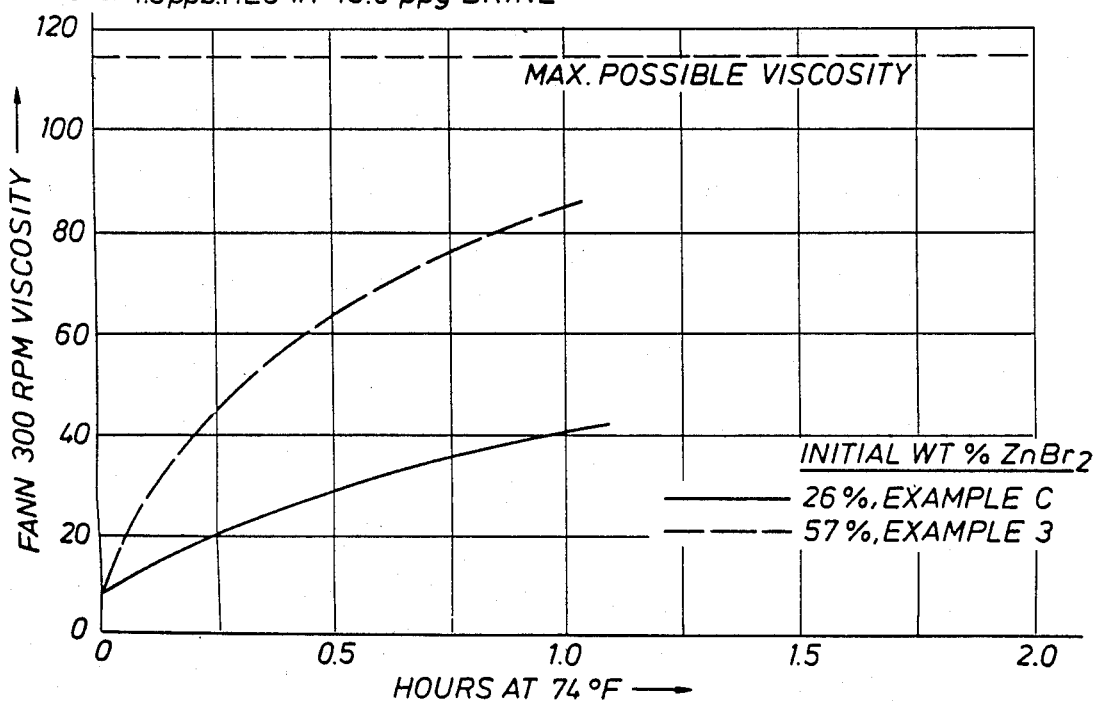
FIG.2 1.5 ppb. HEC IN 15.0 ppg BRINE

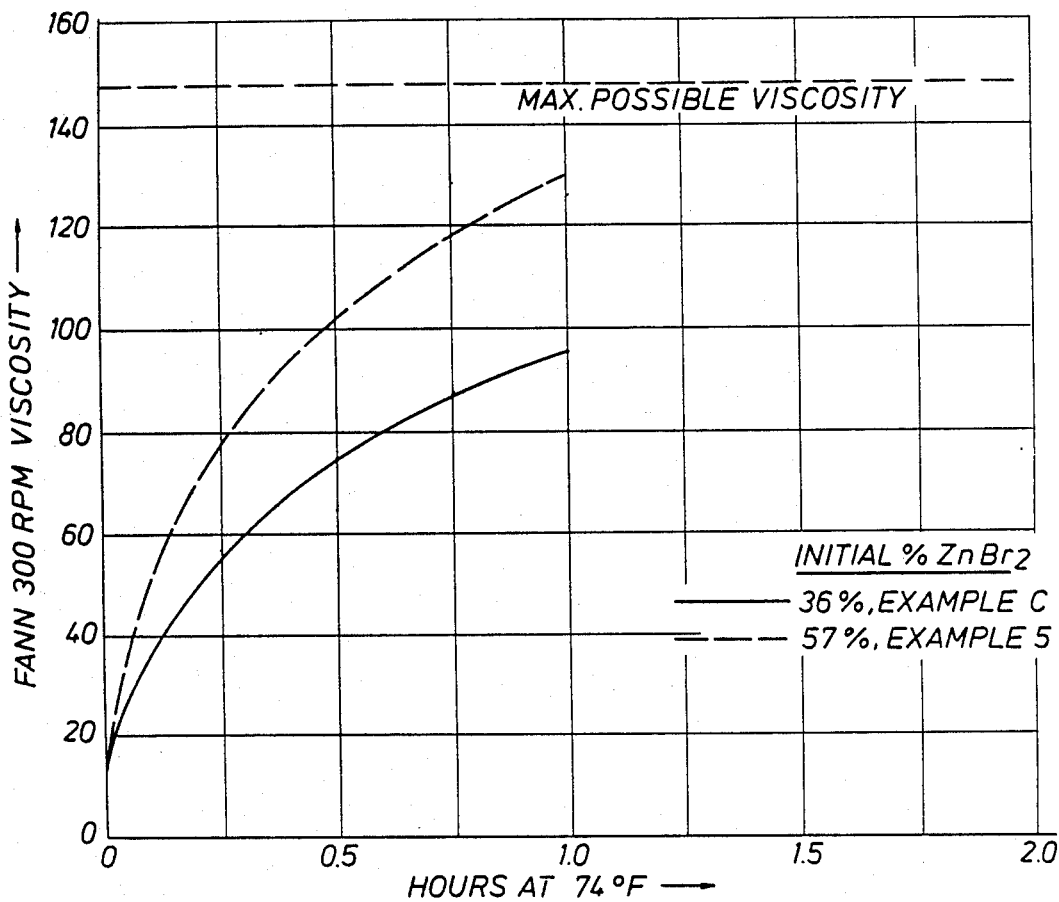
FIG. 3 1.5 ppb. HEC IN 17.0 ppg BRINE
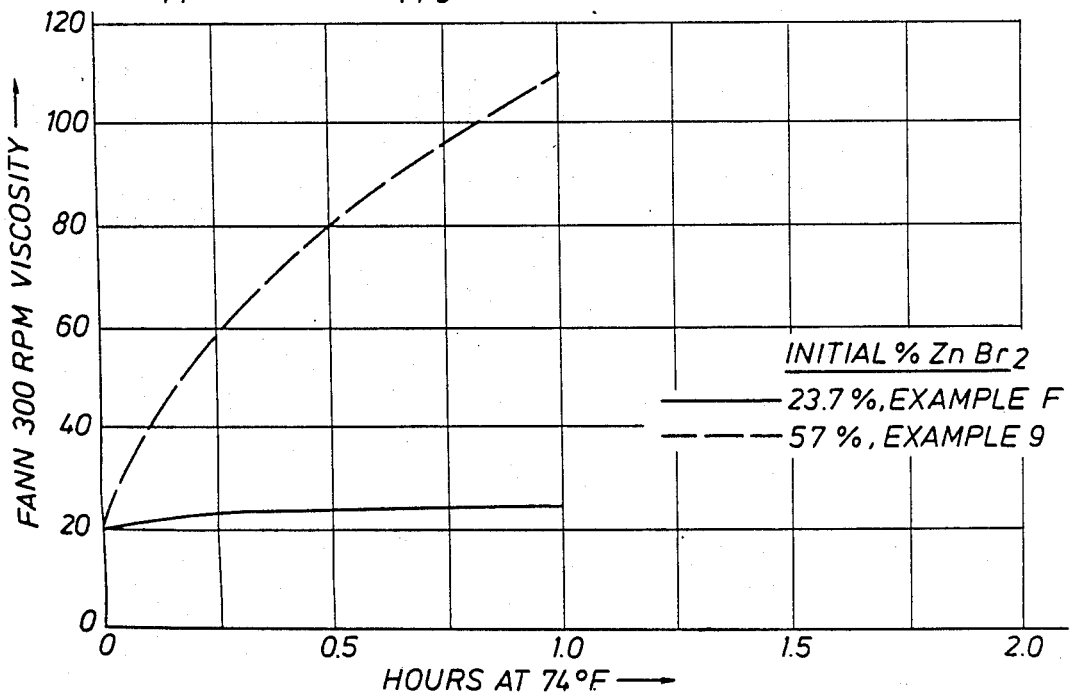
FIG. 4 1.5 ppb. HEC IN 16.5 ppg BRINE ic
METHOD OF INCREASING THE RATE OF HYDRATION OF ACTIVATED HYDROXYETHYL CELLULOSE COMPOSITIONS This is a division of application Ser. No. 262,026, filed May 8, 1981, now U.S. Pat. No. 4,476,032.

BACKGROUND OF THE INVENTION

The present invention relates to methods of increasing the viscosity and decreasing the fluid loss of aqueous brine well servicing fluids, particularly brines containing zinc bromide.

Thickened aqueous mediums, particularly those containing soluble salts, are commonly used as well servicing fluids such as drilling fluids, workover fluids, completion fluids, packer fluids, well treating fluids, subterranean formation treating fluids, spacer fluids, hole abandonment fluids, and other aqueous fluids in which an increase in viscosity is desired. It is known to use hydrophilic polymeric materials such as hydroxyethyl cellulose (HEC) and xanthan gums as thickening agents for aqueous mediums used in such well servicing fluids. However, such polymers are not readily hydrated, solvated or dispersed in certain aqueous systems without elevated temperatures and/or mixing under high shear for extended periods of time. For example, hydroxyethyl cellulose polymers are poorly hydrated, solvated or dispersed at ambient temperature in aqueous solutions containing one or more multivalent cation water soluble salts, such as heavy brines having a density greater than about 11.7 ppg. which are used in well servicing fluids. Other polymers such as xanthan gum require elevated temperatures in even lower density solutions. In many cases, as for example in workover operations, the equipment available for preparing the well servicing fluids does not readily lend itself to high temperature mixing. In well servicing operations where a solids-free well servicing fluid is desired, such as certain completion operations, the fluid cannot be circulated in the hot borehole to increase the temperature of the fluid.

SUMMARY OF THE INVENTION

It is an object of this invention to provide a new method of producing viscous heavy brine well servicing fluids containing zinc bromide.

A further object of this invention is to provide a method of increasing the rate of hydration of polymeric viscosifiers/fluid loss additives in heavy brine well servicing fluids containing zinc bromide.

Another object of this invention is to provide a method of utilizing activated hydroxyethyl cellulose compositions in viscosifying heavy brine well servicing fluids.

The above and other objects of the present invention will become apparent to one skilled in the art from the description given herein and the appended claims.

In accordance with the present invention, there is provided a method of producing a well servicing fluid containing at least 16% by weight zinc bromide, preferably at least 18%, and most preferably at least 20%, which comprises mixing together an activated hydroxyethyl cellulose composition and a solution containing at least 30% zinc bromide, preferably at least 35%, and diluting the resulting viscous solution with a solution containing a salt selected from the group consisting of calcium chloride, calcium bromide, and mixtures thereof, to produce a viscous well servicing fluid having a density in the range from about 14.2 ppg. to about 18.0 ppg.

In another embodiment of this invention, there is provided a method of producing a well servicing fluid containing at least 16% by weight zinc bromide, preferably at least 18%, and most preferably 20%, which comprises mixing together an activated hydroxyethyl cellulose composition and a solution containing a salt selected from the group consisting of calcium chloride, calcium bromide, and mixtures thereof, this solution containing no zinc bromide, and thereafter diluting the resulting viscous solution with a solution containing zinc bromide to produce a viscous well servicing fluid having a density in the range from about 14.2 ppg. to about 18.0 ppg.

BRIEF DESCRIPTION OF THE DRAWINGS

FIG. 1 is a graph showing the viscosity enhancement of brine solutions initially containing varying amounts of zinc bromide.

FIG. 2 is a graph similar to FIG. 1 using a brine solution of different weight.

FIG. 3 is a graph similar to FIG. 1 using a brine solution of differing weight.

FIG. 4 is a graph similar to FIG. 1 using a brine solution of differing weight.

DESCRIPTION OF PREFERRED EMBODIMENTS

The present invention is based on the discovery that the rate of hydration of activated hydroxyethyl cellulose (HEC) in aqueous brines is greatest in brines containing no zinc bromide or in brines containing the largest possible concentration of zinc bromide. Thus zinc bromide containing servicing fluids having enhanced viscosity can be prepared in a much shorter period of time at ambient temperature by first hydrating an activated HEC in a solution containing zinc bromide and thereafter diluting the viscous solution with another solution to give the desired well servicing fluid or by first hydrating an activated HEC in a solution containing no zinc bromide and thereafter diluting the viscous solution with a solution containing zinc bromide to give the desired well servicing fluid.

As discussed in the following listed copending patent applications, incorporated herein by reference for all purposes, HEC will not hydrate and viscosify in heavy brines at ambient temperatures, particularly such brines containing calcium bromide and zinc bromide:

(1) DISPERSIBLE HYDROPHILIC POLYMER COMPOSITIONS, Ser. No. 119,805, filed Feb. 8, 1980, now U.S. Pat. No. 4,330,414;

(2) COMPOSITIONS AND METHOD FOR THICKENING AQUEOUS BRINES, Ser. No. 146,286, filed May 5, 1980, now U.S. Pat. No. 4,392,964; and (3) HEAVY BRINE VISCOSIFIERS AND USES THEREOF, Ser. No. 261,897 filed May 8, 1981, now U.S. Pat. No. 4,439,333, filed contemporaneously herewith.

There are disclosed in these copending patent applications methods of activating HEC such that HEC will hydrate in heavy brines containing calcium bromide and/or zinc bromide at ambient temperatures, and activated HEC compositions for use in such brines.

Thus in Ser. No. 119,805 filed Feb. 8, 1980, now U.S. Pat. No. 4,330,414, there are disclosed activated HEC compositions comprising from about 10% to about 25% by weight HEC, a solvating agent comprising a water miscible, polar organic liquid which when uniformly mixed with HEC in a weight ratio of HEC to solvating agent of 1:2 produces a mixture with no free liquid solvating agent present after remaining quiescent for one week at ambient temperature in a sealed container, and a diluting agent comprising an organic liquid which is not a solvating agent, wherein the weight ratio of HEC to the solvating agent is in the range from about 2.5 to 1 to about 1:4, preferably from about 1 to about 1 to 2. Preferred solvating agents are ethylene glycol and glycerol. Preferred diluting agents are isopropanol, lower alkyl glycol ethers such as ethylene glycol monoethyl ether, ethylene glycol monopropyl ether, and ethylene glycol monobutyl ether, diethylene glycol, low molecular weight ketones, and the like.

In Ser. No. 146,286 filed May 5, 1980, now U.S. Pat. No. 4,392,964, there are disclosed activated HEC compositions for use in heavy brines comprising from about 15% to about 30% by weight HEC, an aqueous liquid in an amount of from about 3% to about 30% by weight, and a water soluble organic liquid, wherein the organic liquid, when uniformly mixed with the HEC in a weight ratio of HEC to organic liquid of 1:2, produces a mixture with free liquid present after remaining quiescent for one week at ambient temperature in a sealed container. Preferred aqueous liquids are water and basic solutions in an amount from about 10% to about 30% by weight. Preferred water soluble organic liquids are isopropanol, lower alkyl glycol ethers such as ethylene glycol monoethyl ether, ethylene glycol monopropyl ether, and ethylene glycol monobutyl ether, diethylene glycol, low molecular weight ketones, and the like.

In the application entitled HEAVY BRINE VISCOSIFIERS AND USES THEREOF, filed contemporaneously herewith on May 8, 1981, now U.S. Pat. No. 4,439,333, there are disclosed activated HEC compositions for use in heavy brines comprising from about 10% to about 30% by weight HEC, a solid organic activating agent, and an organic solvent for the activating agent which, when uniformly mixed with HEC in a weight ratio of HEC to organic solvent of 1:2, produces a mixture with free liquid present after remaining quiescent for one week at ambient temperatures in a sealed container. Preferred organic solvents are water soluble as exemplified by isopropanol, lower alkyl glycol ethers such as ethylene glycol, monoethyl ether, ethylene glycol monopropyl ether, and ethylene glycol monobutyl ether, diethylene glycol, low molecular weight ketones, and the like. Preferred solid organic activating agents are phenol and substituted phenols wherein from 1 to 5 substituent groups are present in the molecule, the substituent groups being selected from the group consisting of OH, $NO_2$, $SO_3H$, Cl, Br, COOH, and mixtures thereof, in an amount from about 10% to about 30% by weight.

The well servicing fluids produced by the present invention contain at least 16% by weight zinc bromide, preferably at least 18% zinc bromide, and most preferably at least 20% zinc bromide. It has been disclosed in copending patent application Ser. No. 161,444 filed June 20, 1980, now U.S. Pat. No. 4,420,406, entitled THICKENED HEAVY BRINES, incorporated herein by reference, that HEC will not hydrate in and efficiently viscosify brines containing zinc bromide unless the concentration of zinc bromide is at least about 20% by weight. We have found, however, that HEC will produce low fluid loss, lower viscosity characteristics in solutions which have a zinc bromide concentration within the range from about 16% to 20%, preferably 18% to 20% by weight. Thus such solutions have utility where low viscosity, low fluid loss well servicing fluids are needed.

Well servicing fluids containing at least 16% zinc bromide, preferably at least 18% zinc bromide, and most preferably at least 20% zinc bromide and having a density in the range from about 14.2 pounds per gallon (ppg.) to about 18.0 ppg. are generally prepared by mixing together a solution containing a high concentration of zinc bromide, such as a 19.2 ppg. solution containing 57% zinc bromide, 20% calcium bromide, and 23% water, and one or more solutions containing a salt selected from the group consisting of calcium chloride, calcium bromide, and mixtures thereof, and in certain cases a solid water soluble salt selected from the group consisting of calcium chloride, calcium bromide, and mixtures thereof. It is preferable to dissolve or suspend the solid water soluble salt in the brine which does not contain zinc bromide before adding the solution which contains zinc bromide. In certain cases a solution containing a salt selected from the group consisting of calcium chloride, calcium bromide, zinc bromide, and mixtures thereof is mixed with a solution containing a high concentration of zinc bromide.

In accordance with the present invention, we have found that the rate of hydration, and hence of viscosity development, is enhanced if the activated HEC composition is either:

(1) added to a solution containing at least 30% by weight zinc bromide, preferably at least 35% by weight, and mixed to produce a viscous solution, and thereafter diluting with the solution containing no zinc bromide (or a lesser amount) to obtain the desired well servicing fluids, or (2) added to the solution which does not contain the bromide and mixed to produce a viscous solution, and thereafter diluting with the solution containing zinc bromide to obtain the desired well servicing fluid.

It is preferred that the solution containing zinc bromide having a density of at least 16.25 ppg., preferably at least 17.0 ppg.

To more fully illustrate the present invention, the following non-limiting examples are presented. All percentages given in the examples and throughout the specification are by weight unless otherwise indicated. All physical property measurements were made in accordance with testing procedures set forth in STANDARD PROCEDURE FOR TESTING DRILLING FLUIDS, API RP 13B, 7th Edition, April, 1978. The HEC polymer employed, unless otherwise indicated, was an HEC marketed by Hercules, Inc., under the tradename NATROSOL 250 HHR.

EXAMPLE A

A 16.0 ppg. brine containing 24.6% $ZnBr_2$ and 38.7% $CaBr_2$ was prepared by mixing together 36% by volume of a 19.2 ppg. $CaBr_2/ZnBr_2$ brine (57% $ZnBr_2$, 20% $CaBr_2$, 23% water) and 64% by volume of a 14.2 ppg. $CaBr_2$ brine (56% $CaBr_2$, 47% water). To 350 ml. (equivalent of 1 bbl. on a lab scale) of this 16.0 ppg. brine were added 7.5 gm. (7.5 ppb.) of an activated hydroethyl cellulose composition containing 20% NATROSOL 250 HHR, 25% glycerin, 0.5% CAB-O-SIL M5, and 54.5% isopropyl alcohol while mixing with a magnetic stirrer. After eight minutes the brine was transferred to a Fann V-G Meter viscosmeter and mixed at 300 rpm for 112 minutes. The 600 and 300 rpm viscosities were obtained after a total mixing time of 15, 30, 60 and 120 minutes. Thereafter the brine was rolled at 1500° F. for 16 hours, cooled to 74° F., and the viscosities again obtained. The data obtained are given in Table 1 and depicted in FIG. 1.

EXAMPLE B

A 16.0 ppg. $CaBr_2$ brine was prepared as in Example A. To 122.5 ml. (equivalent of 0.35 bbl. on a lab scale) of this brine was added 7.5 gm. of the activated HEC used in Example A while mixing with a magnetic stirrer. As the brine thickened the remainder of the brine was added (227.5 ml. = 0.65 bbl.). The brine was then transferred to a Fann V-G Meter and evaluated as in Example A. The data obtained are given in Table 1 and depicted in FIG. 1.

EXAMPLE 1

A 16.0 ppg. $CaBr_2/ZnBr_2$ brine was prepared by mixing with a magnetic stirrer 126 ml. (0.36 bbl.) of the 19.2 ppg. brine of Example A and 7.5 gm. of the activated HEC composition of Example A. As the brine thickened there were added 224 ml. (0.64 bbl.) of the 14.2 ppg. brine of Example A. After eight minutes the brine was transferred to a Fann V-G Meter viscometer and mixed at 300 rpm for 52 minutes. The 600 and 300 rpm viscosities were obtained after 15, 30 and 60 minutes total mixing time. The brine was then rolled at 150° F. for 16 hours, cooled to 74° F., and the viscosities obtained. The data are given in Table 1 and depicted in FIG. 1.

EXAMPLE 2

A 16.0 ppg. $CaBr_2/ZnBr_2$ brine was prepared as in Example 1 except that the activated HEC composition was first added to the 14.2 ppg. brine of Example 1 and, as this brine thickened, it was diluted with the 19.2 ppg. brine of Example 1. The data obtained are given in Table 1.

TABLE 1[1]

| | 1.5 ppb. HEC in a 16.0 ppg. $CaBr_2/ZnBr_2$ Brine | | | | | | | |
|---|---|---|---|---|---|---|---|---|
| Time at | Fann V-G Meter Viscosities | | | | | | | |
| Indicated | Example A | | Example B | | Example 1 | | Example 2 | |
| Temperature | 600 | 300 | 600 | 300 | 600 | 300 | 600 | 300 |
| 15 Minutes @ 74° F. | 46 | 24 | 54 | 31 | 80 | 50 | 80 | 50 |
| 30 Minutes @ 74° F. | 58 | 34 | 70 | 42 | 116 | 76 | 124 | 82 |
| 60 Minutes @ 74° F. | 80 | 50 | 91 | 58 | 148 | 99 | 154 | 105 |
| 120 Minutes @ 74° F. | 101 | 66 | — | — | — | — | — | — |
| 16 Hours @ 150° F. | 168 | 122 | 162 | 119 | 170 | 124 | 171 | 124 |

[1]See FIG. 1

As can be seen from the data in Table 1, adding the HEC to brine solutions containing in excess of 30% by weight $ZnBr_2$ produces solutions having enhanced viscosity after short mixing time. The data also shows that if HEC is first added to a non $ZnBr_2$ containing brine which is then mixed with a $ZnBr_2$ solution, enhanced viscosity after short mixing time is also achieved.

EXAMPLE C

A 15.0 ppg. brine containing 26% zinc bromide, 22.5% $CaBr_2$, and 10.9% $CaCl_2$, was prepared by mixing together 35.6% by volume of the 19.2 ppg. $CaBr_2/ZnBr_2$ brine of Example A, 26.75% by volume of the 14.2 ppg. $CaBr_2$ brine of Example A, and 37.65% by volume of an 11.6 ppg. $CaCl_2$ brine (37.6% $CaCl_2$, 62.4% water). This brine was evaluated as in Example A. The data obtained are given in Table 2 and depicted in FIG. 2.

EXAMPLE 3

A 15.0 ppg. $CaCl_2/CaBr_2/ZnBr_2$ brine was prepared by mixing with a magnetic stirrer 124.5 ml. (0.356 bbl.) of the 19.2 ppg. brine of Example A and 7.5 gm. of the activated HEC composition of Example A. As the brine thickened there were first added 132 ml. (0.3765 bbl.) of the 11.6 ppg. $CaCl_2$ brine of Example C followed by 93.5 ml. (0.2675 bbl.) of the 14.2 ppg. $CaBr_2$ brines of Example A. After eight minutes the brine was transferred to a Fann V-G Meter and evaluated as in Example 1. The data obtained are given in Table 2 and depicted in FIG. 2.

TABLE 2[1]

| | 1.5 ppb. HEC in a 15.0 ppg. $CaCl_2/CaBr_2/ZnBr_2$ Brine | | | |
|---|---|---|---|---|
| | Example C | | Example 3 | |
| Fann V-G Viscosities | 600 rpm | 300 rpm | 600 rmp | 300 rmp |
| 15 Minutes @ 74° F. | 38 | 20 | 75 | 46 |
| 30 Minutes @ 74° F. | 51 | 28 | 100 | 64 |
| 60 Minutes @ 74° F. | 71 | 41 | 128 | 84 |
| 16 Hours @ 150° F. | 165 | 116 | 157 | 112 |

[1]See FIG. 2

EXAMPLE D

A 16.5 ppg. brine containing 23.7% $ZnBr_2$, 33.6% $CaBr_2$, and 10.0% $CaCl_2$ was prepared by mixing together on a Multimixer 125 ml. (0.357 bbl.) of the 19.2 ppg. brine of Example A, 194 ml. (0.555 bbl.) of the 14.2 ppg. brine of Example A, 6.5 ml. (0.018 bbl.) of the 11.6 ppg. brine of Example C, and 66.2 gm. of 95% active $CaCl_2$ pellets. This brine was evaluated as in Example A. The data obtained are given in Table 3.

EXAMPLE 4

A 16.5 ppg. $CaCl_2/CnBr_2/ZnBr_2$ brine was prepared by mixing with a magnetic stirrer 125 ml. (0.357 bbl.) of the 19.2 ppg. brine of Example A and 7.5 gm. of the activated HEC composition of Example A. As the brine thickened there were added 225 ml. (0.643 bbl.) of a 15.0 ppg. brine prepared by mixing together on a Multimixer 194 ml. of the 14.2 ppg. brine of Example A, 6.5 ml. of the 11.6 ppg. brine of Example C, and 66.2 gm. of 95% active $CaCl_2$ pellets. After 12 minutes the brine was transferred to a Fann V-G Meter and evaluated as in Example 1. The data obtained are given in Table 3.

TABLE 3

| | 1.5 ppb. HEC in a 16.5 ppg. $CaCl_2/CaBr_2/ZnBr_2$ Brine | | | |
|---|---|---|---|---|
| | Example D | | Example 4 | |
| Fann V-G Viscosities | 600 rpm | 300 rpm | 600 rpm | 300 rpm |
| 15 Minutes @ 74° F. | 55 | 28 | 83 | 45 |

TABLE 3-continued

| | 1.5 ppb. HEC in a 16.5 ppg. CaCl$_2$/CaBr$_2$/ZnBr$_2$ Brine | | | |
|---|---|---|---|---|
| | Example D | | Example 4 | |
| Fann V-G Viscosities | 600 rpm | 300 rpm | 600 rpm | 300 rpm |
| 30 Minutes @ 74° F. | 55 | 28 | 85 | 46 |
| 60 Minutes @ 74° F. | 54 | 27 | 85 | 46 |
| 16 Hours @ 150° F. | 92 | 49 | 152 | 82 |

EXAMPLE E

A 17.0 ppg. brine containing 36% ZnBr$_2$ and 32% CaBr$_2$, and containing 65% by volume of the 19.2 brine of Example A and 44% of the 14.2 ppg. brine of Example A, was prepared and evaluated as in Example A. The data obtained are given in Table 4 and depicted in FIG. 3.

EXAMPLE 5

A 17.0 ppg. CaBr$_2$/ZnBr$_2$ brine containing 196 ml. (0.56 bbl.) of the 19.2 ppg. brine of Example A and 154 ml. (0.44 bbl.) of the 14.2 ppg. brine of Example A was prepared and evaluated as in Example 1. The data obtained are given in Table 4 and depicted in FIG. 3.

TABLE 4[1]

| | 1.5 ppb. HEC in a 17.0 ppg. CaBr$_2$/ZnBr$_2$ Brine | | | |
|---|---|---|---|---|
| | Example E | | Example 5 | |
| Fann V-G Viscosities | 600 rpm | 300 rpm | 600 rpm | 300 rpm |
| 15 Minutes @ 74° F. | 78 | 48 | 94 | 59 |
| 30 Minutes @ 74° F. | 115 | 76 | 151 | 103 |
| 60 Minutes @ 74° F. | 139 | 95 | 181 | 128 |
| 16 Hours @ 150° F. | 203 | 149 | 200 | 146 |

[1]See FIG. 3

EXAMPLE 6

A 16.0 ppg. brine containing 24.6% ZnBr$_2$ and 38.7% CaBr$_2$ was prepared by mixing together 175 ml. (0.5 bbl.) of a 17.8 ppg. brine containing 44.3% ZnBr$_2$ and 27.4% CaBr$_2$ and 7.5 gm. of the activated HEC composition of Example A. As the brine thickened there were added 175 ml. (0.5 bbl.) of the 14.2 ppg. brine of Example A. After eight minutes the brine was transferred to a Fann V-G Meter and evaluated as in Example. The data obtained are given in Table 5 and depicted in FIG. 1.

EXAMPLE 7

A 16.0 ppg. brine containing 24.6% ZnBr$_2$ and 38.7% CaBr$_2$ was prepared by mixing together 122.5 ml. (0.35 bbl.) of a 16.77 ppg. brine containing 33.5% ZnBr$_2$ and 33.5% CaBr$_2$ and 7.5 g. of the activated HEC composition of Example A. As the brine thickened there were added 122.5 ml. (0.35 bbl.) of this same brine and 105 ml. (0.35 bbl.) of the 14.2 ppg. brine of Example A. Thereafter the brine was evaluated as in Example 8. The data are given in Table 5 and depicted in FIG. 1.

EXAMPLE 8

A 16.0 ppg. brine containing 24.6% ZnBr$_2$ and 38.7% was prepared by mixing together 140 ml. (0.4 bbl.) of a 16.45 ppg. brine containing 29.9% ZnBr$_2$ and 35.7% and 7.5 gm. of the activated HEC composition of Example A. As the brine thickened there were added 140 ml. (0.4 bbl.) of this same brine and 70 ml. (0.2 bbl.) of the 14.2 ppg. brine of Example A. Thereafter the brine was evaluated as in Example 8. The data are given in Table 5 and depicted in FIG. 1.

TABLE 5*

| | 1.5 ppb. HEC in a 16.0 ppg. CaBr$_2$/ZnBr$_2$ Brine | | | | | |
|---|---|---|---|---|---|---|
| Time at | Fann V-G Meter Viscosities | | | | | |
| Indicated | Example 6[(1)] | | Example 7[(2)] | | Example 8[(3)] | |
| Temperature | 600 | 300 | 600 | 300 | 600 | 300 |
| 15 Minutes @ 74° F. | 81 | 48 | 68 | 42 | 63 | 38 |
| 30 Minutes @ 74° F. | 114 | 74 | 82 | 52 | 75 | 46 |
| 60 Minutes @ 74° F. | 144 | 96 | 99 | 65 | 94 | 59 |
| 16 Hours @ 150° F. | 158 | 115 | 158 | 116 | 154 | 113 |

[(1)]Initial % ZnBr$_2$ = 44.3%
[(2)]Initial % ZnBr$_2$ = 33.5%. See FIG.
[(3)]Initial % ZnBr$_2$ = 29.9%
*See FIG. 1

EXAMPLE F

A 16.5 ppg. brine containing 23.7% ZnBr$_2$ 43.8% CaBr$_2$ was prepared by mixing together 125 ml. (0.357 bbl.) of the 19.2 ppg. brine of Example A and 225 ml. (0.643 bbl.) of a 15.0 ppg. brine containing 60.1% CaBr$_2$. This brine was evaluated as in Example B. The data are given in Table 6 and depicted in FIG. 4.

EXAMPLE 9

A 16.5 ppg. brine containing 23.7% ZnBr$_2$ and 43.8% CaBr$_2$ was prepared by mixing 125 ml. (0.357 bbl.) of the 19.2 ppg. brine of Example A with 7.5 gm. of the activated HEC composition of Example A. As the brine thickened there were added 225 ml. (0.643 bbl.) of the 15.0 ppg. brine of Example F. The brine was evaluated as in Example 4. The data are given in Table 6 and depicted in FIG. 4.

TABLE 6[1]

| | 1.55 ppb. HEC in a 16.5 ppg. CaBr$_2$/ZnBr$_2$ Brine | | | |
|---|---|---|---|---|
| Time at | Fann V-G Meter Viscosities | | | |
| Indicated | Example F | | Example 9 | |
| Temperature | 600 | 300 | 600 | 300 |
| 15 Minutes @ 74° F. | 43 | 22 | 99 | 58 |
| 30 Minutes @ 74° F. | 44 | 23 | 131 | 80 |
| 60 Minutes @ 74° F. | 45 | 24 | 176 | 110 |
| 16 Hours @ 150° F. | 127 | 81 | 230 | 165 |

[1]See FIG. 4

EXAMPLE G

The process of Example B was repeated except that the activated HEC composition contained 20% NATROSOL 250 HHR, 25% 0.25N NaOH, and 55% isopropanol. The data obtained are given in Table 7.

EXAMPLE 10

The process of Example 1 was repeated using the activated HEC composition of Example G. The data obtained are given in Table 7.

EXAMPLE H

The process of Example B was repeated except that the activated HEC composition contained 20% NATROSOL 250 HHW, 20% pyrocatechol, and 60% isopropanol. The data obtained are given in Table 7.

EXAMPLE 11

The process of Example 1 was repeated using the activated HEC composition in Example H. The data obtained are given in Table 7.

TABLE 7

1.5 ppb. HEC in a 16.0 ppg. CaBr$_2$/ZnBr$_2$ Brine

| Time at Indicated Temperature | Example G 600 | 300 | Example 10 600 | 300 | Example H 600 | 300 | Example 11 600 | 300 |
|---|---|---|---|---|---|---|---|---|
| 15 Minutes @ 74° F. | 60 | 34 | 75 | 46 | 72 | 43 | 91 | 55 |
| 30 Minutes @ 74° F. | 73 | 46 | 102 | 66 | 104 | 67 | 125 | 80 |
| 60 Minutes @ 74° F. | 101 | 66 | 133 | 89 | 149 | 100 | 146 | 96 |
| 16 Hours @ 150° F. | 166 | 122 | 165 | 121 | 157 | 117 | 157 | 115 |

The data, as seen from the Tables and FIGS. 1-4, indicate that the rate of viscosity development of activated HEC compositions in brines containing zinc bromide is significantly increased by the method of the present invention. The data also indicates that zinc bromide must not be present in the brine in which the HEC is initially mixed or should be greater than about 30% by weight, preferably greater than about 35%.

The invention may be embodied in other specific forms without departing from the spirit or essential characteristics thereof. The present embodiments are therefore to be considered, in all respects as illustrative and not restrictive, the scope of the invention being indicated by the appended claims rather than by the foregoing description, and all changes which come within the meaning and range of equivalence of the claims are therefore intended to be embraced therein.

We claim:

1. In a method of producing a well servicing fluid wherein a first solution containing zinc bromide is mixed with at least one second solution having dissolved therein a salt selected from the group consisting of calcium chloride, calcium bromide, and mixtures thereof, the improvement which comprises the following steps in the order indicated:
   (a) admixing a hydroxyethyl cellulose composition with said second solution to produce a viscosified solution and
   (b) thereafter admixing said viscosified solution with said first solution containing zinc bromide and having a density of at least 17.0 ppg to give the desired well servicing fluid having a density in the range from about 14.2 ppg to about 18.0 ppg, said hydroxyethyl cellulose being activated prior to admixture so as to substantially hydrate or solubilize in said second solution at ambient temperatures.

2. The method of claim 1 wherein said second solution contains calcium chloride.

3. The method of claim 1 wherein said second solution contains calcium bromide.

4. The method of claim 1 wherein the well servicing fluid contains at least 16% by weight zinc bromide.

5. The method of claim 1 wherein the well servicing fluid contains at least 18% by weight zinc bromide.

6. The method of claim 1 wherein the well servicing fluid contains at least 20% by weight zinc bromide.

* * * * *